(12) United States Patent
King et al.

(10) Patent No.: US 7,705,491 B2
(45) Date of Patent: Apr. 27, 2010

(54) APPARATUS, SYSTEM, AND METHOD FOR AUTOMATICALLY DISPLACING A FAULTY IN-USE BATTERY IN A BATTERY-POWERED ELECTRIC EQUIPMENT

(75) Inventors: Allen King, San Jose, CA (US); Lawrence C. Liang, San Jose, CA (US)

(73) Assignee: SV Powertech, Inc, San Jose, CA (US)

( * ) Notice: Subject to any disclaimer, the term of this patent is extended or adjusted under 35 U.S.C. 154(b) by 260 days.

(21) Appl. No.: 12/032,514

(22) Filed: Feb. 15, 2008

(65) Prior Publication Data

US 2009/0206679 A1 Aug. 20, 2009

(51) Int. Cl.
H02J 1/00 (2006.01)
H02J 3/00 (2006.01)
(52) U.S. Cl. .......................................... 307/80; 307/64
(58) Field of Classification Search ................... 307/64, 307/66, 80, 125; 320/116, 112
See application file for complete search history.

(56) References Cited

U.S. PATENT DOCUMENTS

| 4,277,737 A | 7/1981 | Muller-Werth |
| 4,962,462 A | 10/1990 | Fekete |
| 5,534,364 A | 7/1996 | Watanabe et al. |
| 5,619,417 A | 4/1997 | Kendall |
| 5,656,915 A | 8/1997 | Eaves |
| 5,703,464 A | 12/1997 | Karunasiri et al. |
| 5,931,245 A | 8/1999 | Uetake et al. |

*Primary Examiner*—Stephen W Jackson
*Assistant Examiner*—Carlos Amaya
(74) *Attorney, Agent, or Firm*—Kunzler Needham Massey & Thorpe

(57) ABSTRACT

An apparatus, system, and method are disclosed for automatically displacing a faulty in-use member battery in an electric equipment, such as electric vehicle, powered by an array of member batteries configured to self detect battery fault conditions and output a control signal upon such detection. By use of a charged spare battery and deactivated single pole double throw relay switches with activation means for coupling all batteries, member batteries are normally interconnected in series electrically to provide a predetermined voltage, with the spare battery standing by. While the electric equipment is in operation, as soon as a member battery detects a fault, the corresponding relay switch is activated to cause the faulty member battery to be electrically bypassed by the battery array. Concurrently, the spare relay switch is activated to electrically connect the spare battery to the battery array in series, thereby displacing the faulty in-use member battery.

17 Claims, 12 Drawing Sheets

APPARATUS, SYSTEM, AND METHOD FOR AUTOMATICALLY DISPLACING A FAULTY IN-USE BATTERY IN A BATTERY-POWERED ELECTRIC EQUIPMENT

BACKGROUND OF THE INVENTION

1. Field of the Invention

This invention relates to multiple-battery electric systems, and more particularly relates to electric equipment, such as an electric vehicle, powered by a redundant array of batteries.

2. Description of the Related Art

Electric equipment, such as an electric vehicle ("EV"), utilizes chemical energy stored in rechargeable batteries which is converted to electricity. EVs use electric motors instead of, or in addition to, internal combustion engines. In the latter case, the EV is referred to as a hybrid electric vehicle ("HEV"). At the heart of an EV, there are three main components: batteries, electric motor controller, and electric motor. Batteries supply power to the electric motor controller, which controls the amount of voltage and current supplied to the electric motor based on the position of the accelerator pedal. Batteries used in EVs vary in type, number, voltage and placement. Operating voltage can be 360 volts (or higher). With the use of 12-volt batteries, for instance, 30 batteries (or more) connected in series are required to obtain such voltage.

Nowadays more and more EVs are traveling on the U.S. roads and highways. Batteries used to power the EVs are rapidly becoming very important components of the vehicles. Current battery technology is adequate for EVs with a range, for example, of 250 miles, but the batteries are still rather expensive and require elaborate safety mechanisms. One type of batteries known as lithium-ion batteries, being widely used in laptops, cell phones, and other mobile devices, fall in that category. In the wake of recent massive recalls of Sony lithium-ion batteries used in millions of laptop computers because of incidents of battery overheating or bursting into flames, many industry experts are paying tremendous attention to the safety enhancements of these batteries, as well as other types of batteries.

Because of the small form factor, environmentally friendliness, and desired energy density achievability, lithium-ion cells, in particular, are increasing in popularity among some EV manufacturers as well, when selecting batteries for their end products. Some battery packs they use are capable of delivering as much as 200 kilowatts of electric power. For that kind of capacity, the manufacturers consider safety as a primary criterion in the battery pack's design and architecture. Packaging and cooling system designs are also important considerations.

In addition to cell-level safety protection, those manufacturers provide multiple battery pack level safety features. Besides cell fuses, a pack that may include a number of battery modules has module fuses, each guarding against a short circuit across the complete module. Microprocessors, logic circuitry and sensors are used to continually monitor voltages, currents and temperatures within the pack. During normal vehicle operation, the battery logic board communicates with the vehicle to initiate battery cooling, report state of charge, and signal battery faults. Additionally, to enhance battery safety, whenever at least one of the fault conditions, such as over current, short circuit, cell and pack over-voltage and over temperature, occurs, with a certain design, the battery cells are disconnected from the system by turning off two back-to-back protection MOSFETs that are connected in series with the battery pack. Manufacturers claim that a fundamental element of the vehicle and battery pack safety design is the ability to electrically disconnect the high voltage of the pack from the rest of the vehicle (by controlling high voltage contactors, for example) if any number of adverse conditions are detected.

If the EV is moving when a serious cell failure occurs, the numerous built-in electronic sensors will detect the failure and will disconnect the high voltage from the vehicle. Unfortunately, this will bring the vehicle to a stop, with all the high voltage and energy contained within the battery pack. Following a serious battery failure, the vehicle will be inoperable until the battery pack is serviced. This can happen anywhere on the road, causing the vehicle driver to be stranded, possibly in the middle of nowhere. That can place him/her in an unsafe situation.

From the foregoing discussion, it should be apparent that a need exists for an apparatus, system, and method that enable the EV to keep moving until the driver determines it is safe to stop the vehicle for a service action on the faulty battery. Beneficially, such an apparatus, system, and method would enhance the value of the EV.

SUMMARY OF THE INVENTION

The present invention has been developed in response to the present state of the art, and in particular, in response to the problems and needs in the art that have not yet been fully solved by currently available system architecture and structure of electric equipment, such as an EV, powered by an array of batteries numbered 1 through N. Accordingly, the present invention has been developed to provide an apparatus, system, and method for automatically displacing a faulty in-use member battery that overcome many or all of the above-discussed shortcomings in the art.

The apparatus for automatically displacing a faulty in-use member battery of the battery array is provided with a logic unit containing a plurality of modules configured to functionally execute the necessary steps of such displacement. These modules in the described embodiments include a charged spare battery, a spare relay switch, a spare relay driver coupled to the spare relay switch, a plurality of member relay switches corresponding in number to member batteries, a plurality of member relay drivers coupled to the corresponding member relay switches, and a battery fault handler module.

In a certain embodiment, already commercially available, the spare battery having electric characteristics like those of member batteries can be utilized within a year or longer at a normal temperature once fully charged. The spare battery is dynamically connectable to the battery array in series electrically. Provided in an EV, for example, as a displacement for a faulty in-use member battery, the spare battery is required to be ready instantly on demand while the vehicle is moving. The spare relay switch is coupled to the spare battery and the battery array, such that the spare battery is electrically bypassed and disconnected from the battery array normally while the spare relay switch is deactivated. When activated, the spare relay switch electrically connects the spare battery with the battery array in series continuously. The spare relay driver activates the spare relay switch in response to a trigger input signal.

Coupled to corresponding member batteries, member relay switches while deactivated are adapted to electrically interconnect member batteries in series to provide a predetermined voltage across the two end terminals, one positive and the other negative, of the battery array. When individually activated, a member relay switch electrically bypasses and disconnects the corresponding member battery from the battery array continuously. Each member relay driver is used to activate its coupled member relay switch in response to a trigger input signal. In a further embodiment, each said relay driver includes a normally closed switch manually operable to deactivate the activated coupled relay switch.

In the disclosed embodiments, each member battery is configured to detect battery fault conditions. As a fault condition is detected, the member battery outputs a "fault-detected" control signal to the battery fault handler module. The battery fault handler module responsive to such control signal provides a trigger input signal to the corresponding member relay driver to thereby activate the coupled relay switch, thus electrically bypassing and disconnecting the faulty member battery from the battery array. Concurrently, the battery fault handler module provides a trigger input signal to the spare relay driver to thereby activate the spare relay switch, thus electrically connecting the spare battery with the battery array in series. In effect, the connected spare battery displaces the faulty member battery. Consequently, the battery array continues to produce the predetermined voltage.

In another aspect of the present invention, a system is presented to enable automatic displacing of a faulty in-use member battery in a battery-powered electric equipment. In particular, the system, in the disclosed embodiments, includes an equipment operating unit, an equipment operation controller coupled to said unit, and a battery enclosure coupled to the equipment operation controller and comprising a battery array, a battery connect controller, and appropriate cooling means. The battery array includes a plurality of member batteries numbered 1 through N. In the disclosed embodiments, each member battery is configured to detect battery fault conditions. As a fault condition is detected, the member battery outputs a "fault-detected" control signal to the battery connect controller.

The equipment operating unit in an electric equipment, such as EV, typically includes an electric motor, traction wheels, and other parts of the drive system that performs the same functions as that of a vehicle powered by an internal combustion engine. The electric motor is used to turn the traction wheels of the vehicle to cause the EV to move. The equipment operation controller delivers electric power to the electric motor in the equipment operating unit from the member batteries and controls the amount of power delivered based on the position of the vehicle accelerator pedal. The electric motor converts electrical energy into mechanical energy.

In one embodiment, the battery connect controller includes a charged spare battery, a spare relay switch, a spare relay driver coupled to the spare relay switch, a plurality of member relay switches corresponding in number to member batteries, a plurality of member relay drivers coupled to the corresponding member relay switches, and a battery fault handler module, and a plurality of electric leads with connection means. The charged battery has electric characteristics like those of member batteries and is dynamically connectable to the battery array in series electrically. The spare relay switch is coupled to the spare battery and the battery array, such that the spare battery is electrically bypassed and disconnected from the battery array normally while the spare relay switch is deactivated. When activated, the spare relay switch electrically connects the spare battery with the battery array in series continuously. The spare relay driver activates the spare relay switch in response to a trigger input signal.

Coupled to corresponding member batteries, member relay switches while deactivated are adapted to electrically interconnect member batteries in series to supply a predetermined voltage across the two end terminals, one positive and the other negative, of the battery array to the equipment operation controller. When individually activated, a member relay switch electrically bypasses and disconnects the corresponding member battery from the battery array continuously. Each member relay driver is used to activate its coupled member relay switch in response to a trigger input signal.

The battery fault handler module responsive to the fault-detected control signal output by a member battery detecting a fault condition provides a trigger input signal to the corresponding member relay driver to thereby activate the coupled relay switch, thus electrically bypassing and disconnecting the faulty member battery from the battery array. Concurrently, the battery fault handler module provides a trigger input signal to the spare relay driver to thereby activate the spare relay switch, thus electrically connecting the spare battery with the battery array in series, displacing the faulty member battery. As a result, the battery array continues to provide the predetermined voltage to the equipment operation controller. The electric leads with connection means are used to interconnect batteries with relay switches mentioned above. In a preferred embodiment, a local "member battery off" indicator identifying the faulty member battery, and a local identifying "spare battery on" indicator as well as a remote alerting "spare battery on" indicator are provided to the equipment operator while the spare battery is connected to the battery array.

A method of the present invention is also presented for automatically displacing a faulty in-use member battery in an electric equipment powered by an array of member batteries numbered 1 through N. The method in the disclosed embodiments substantially includes the steps necessary to carry out the functions presented above with respect to the operation of the described apparatus and system. In one embodiment, the method includes providing a charged spare battery dynamically connectable to the battery array in series electrically with electric characteristics like those of member batteries, providing a spare relay switch with activation means, coupling the spare relay switch to the spare battery and the battery array such that the spare battery is normally bypassed and disconnected from the battery array, providing a plurality of member relay switches corresponding in numbers to member batteries each configured to detect battery fault conditions and output a fault-detected control signal upon detecting a fault condition, coupling member relay switches to corresponding member batteries to electrically interconnect member batteries in series to produce a predetermined voltage, powering the electric equipment for operation, monitoring fault detection by each member battery, activating upon the occurrence of a fault condition detected by a member battery the corresponding member relay switch to thereby electrically bypass and disconnect the faulty member battery from the battery array, and activating upon the occurrence of a fault condition detected by any member battery the spare relay switch to thereby electrically connect the spare battery to the battery array in series.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention employs relay switches functionally equivalent to single pole double throw switches to electrically connect member batteries in series to produce a predetermined voltage while those relay switches are deactivated, as if using straight electric leads for interconnecting batteries. Yet, when a member battery becomes faulty, its associated relay switch can be simply activated to bypass the faulty member battery and disconnect it from the battery array to avoid any impact of the fault. With the use of a relay switch of the same kind, the spare battery can be electrically bypassed normally and, when a faulty member battery is detected, the spare battery can be electrically connected to the battery array in series as a displacement, merely by means of appropriate relay switch wiring. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
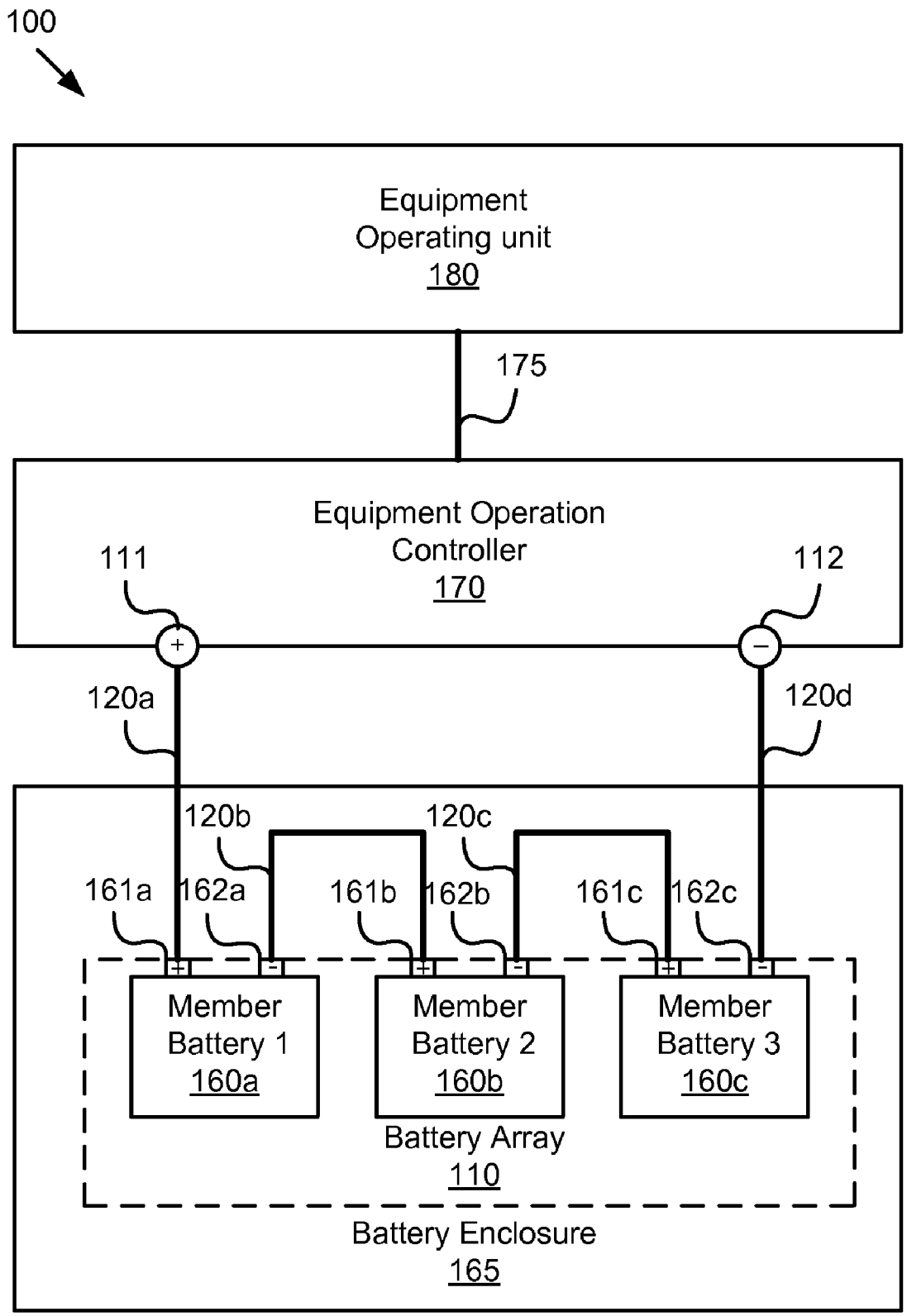
FIG. 1 is a schematic block diagram illustrating one embodiment of a typical prior art system for interconnecting an array of member batteries in a battery-powered electric equipment.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a typical prior art system 100 for interconnecting an array of member batteries in a battery-powered electric equipment. The system 100 includes an equipment operating unit 180, an equipment operation controller 170, an interface 175 coupling said controller 170 to the equipment operating unit 180, and a battery enclosure 165 comprising a battery array 110, and a plurality of electric leads 120. The battery array includes member battery 1 160a, member battery 2 160b, and member battery 3 160c. Each member battery 160 has a positive terminal 161 and a negative terminal 162. In general, batteries are said to be in series when the negative terminal of one battery is connected to the positive terminal of the adjacent battery, and this arrangement may be continued for any desired number of batteries. The voltage of batteries in series is additive. The two end terminals, one positive and one negative, of thus interconnected batteries in a battery array are connected to the higher level equipment component for providing a pre-determined voltage across them.

As depicted, the member batteries 160 are electrically connected in series to output a predetermined voltage to the equipment operation controller 170 across its two input terminals: the positive terminal 111 and the negative terminal 112. In a typical embodiment, the inter-battery connection arrangement shown begins with the electric lead 120a connecting the positive terminal 111 of the equipment operation controller 170 to the positive terminal 161a of member battery 1 160a, continues with a first electric lead 120b connecting the negative terminal 162a of member battery 1 160a with the positive terminal 161b of member battery 2 160b, with a second electric lead 120c connecting the negative terminal 162b of member battery 2 160b with the positive terminal 161c of member battery 3 160c, and ends with the electric lead 120d connecting the negative terminal 162c of member battery 3 160c with the negative terminal 112 of the equipment operation controller 170. The equipment operation controller 170 thus obtains a predetermined voltage from three member batteries 160 simply connected in series electrically with four electric leads 120. The disadvantage of this simple battery interconnection arrangement is the crippling effect of any single member battery's 160 failure on the ability of the entire battery array 110 to supply pre-determined power to the equipment operation controller 170.

Figure 2:
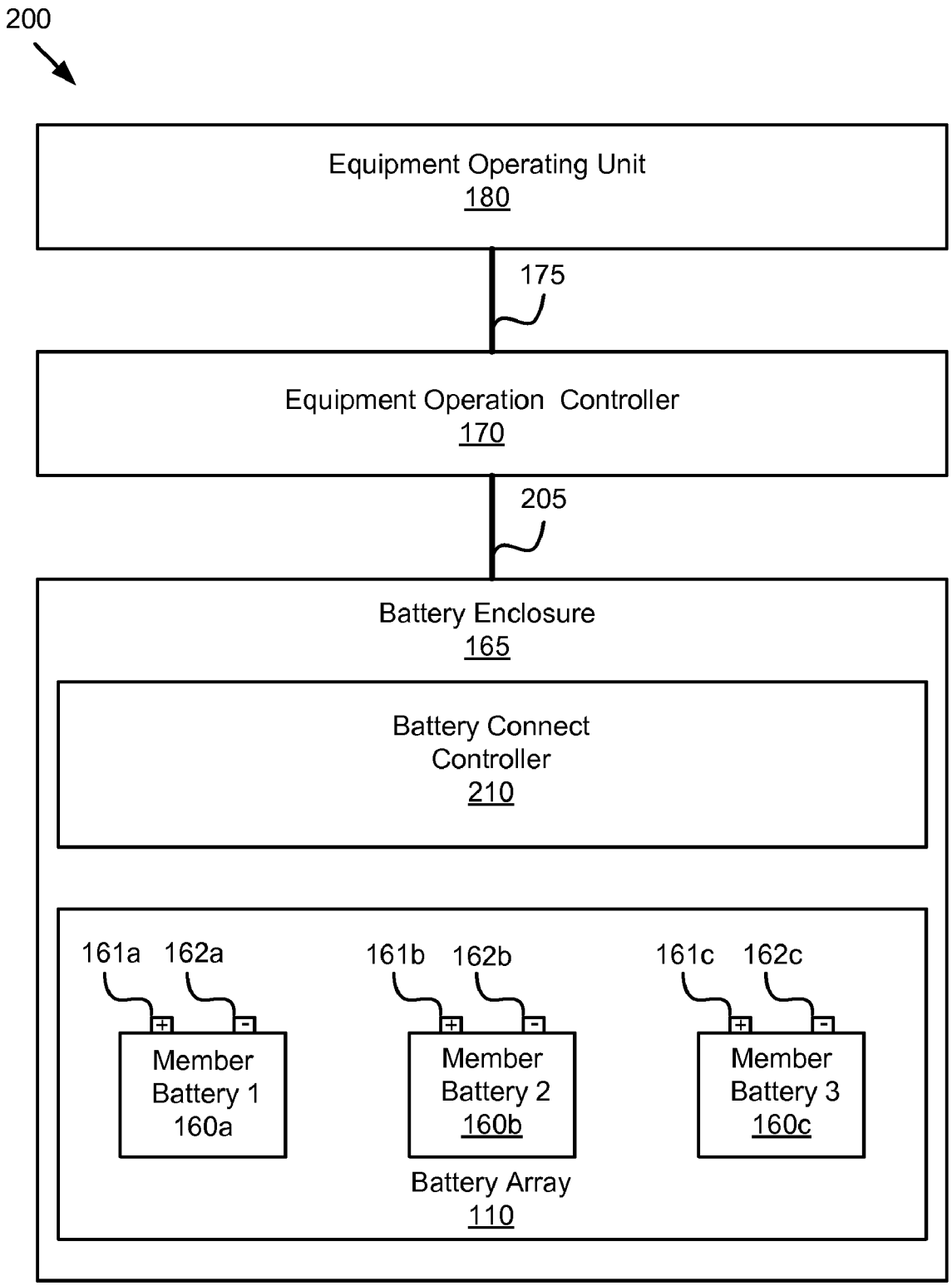
FIG. 2 is a schematic block diagram illustrating one embodiment of a system for automatically displacing a faulty in-use member battery in electric equipment powered by an array of batteries in accordance with the present invention.

FIG. 2 is a schematic block diagram illustrating one embodiment of a system 200 for automatically displacing a faulty in-use member battery in electric equipment powered by an array of member batteries in accordance with the present invention. The description of system 200 refers to elements of FIG. 1, like numbers referring to like elements. The system 200 includes an equipment operating unit 180, an equipment operation controller 170, an interface 175 coupling the equipment operation controller 170 to the equipment operating unit 180, a battery enclosure 165, and a battery connect interface 205 coupling the battery enclosure 165 to the equipment operation controller 170. The battery enclosure 165 includes a battery connect controller 210, a battery array 110, and appropriate cooling means (not shown) for battery cooling. As indicated in FIG. 1, the battery array 110 includes member battery 1 160a, member battery 2 160b, and member battery 3 160c. Although three member batteries 160 are shown in the battery array 110, any number of member batteries 160 may be employed, including the number one (1).

In one embodiment, the electric equipment referred to in the system 200 is an EV. As such, the components (not shown) in a typical equipment operating unit 180 include an electric motor, traction wheels, and other parts of a drive system that may also be used in an internal combustion vehicle. The equipment operation controller 170 supplies electric power to the electric motor from the battery array 110 through the battery connect interface 205. When the EV driver presses the accelerator pedal, a signal is sent to the equipment operation controller 170, which in turn supplies an appropriate amount of current and voltage from the battery array 110 to the electric motor based on the position of said pedal. The electric motor in turn applies torque to the EV wheels for turning, causing the EV to move.

The equipment operation controller 170 operates between member batteries 160 and the electric motor to control speed and acceleration in the EV. The equipment operation controller 170 either transforms the member batteries' 160 DC current into alternating current for an AC motor or simply regulates current flow for a DC motor. The equipment operation controller 170 can also reverse the field coils of the motor, so that when in a braking mode, the motor becomes a generator, and some energy is put back into member batteries 160.

In certain embodiments, member batteries 160 are equipped with current, voltage, and temperature monitoring means (not shown) and analysis means (not shown) for normal operation. In addition, safety circuitry including electronic protection devices may be provided, so that if any of battery fault conditions such as short circuit, over voltage, over current, and over temperature is detected in a member battery 160, the member battery 160 may output a "fault-detected" control signal to the vehicle and can shut itself down afterwards.

In order to prevent the battery array 110 from stopping delivering required power to the equipment operation controller 170 as a result of a detected battery fault condition, which can cause the EV to stop in the middle of nowhere, the battery connect controller 210 provides means to automatically and safely displace the faulty in-use member battery 160. Consequently, the battery array 110 can continue to deliver predetermined voltage to the equipment operation controller 170 to substantially keep the vehicle moving as usual. The vehicle driver will ultimately determine when it is safe to stop the vehicle for a service action on the faulty member battery 160. Details on how the battery connect controller 210 is structured and operates will be provided in succeeding sections.

Figure 3:
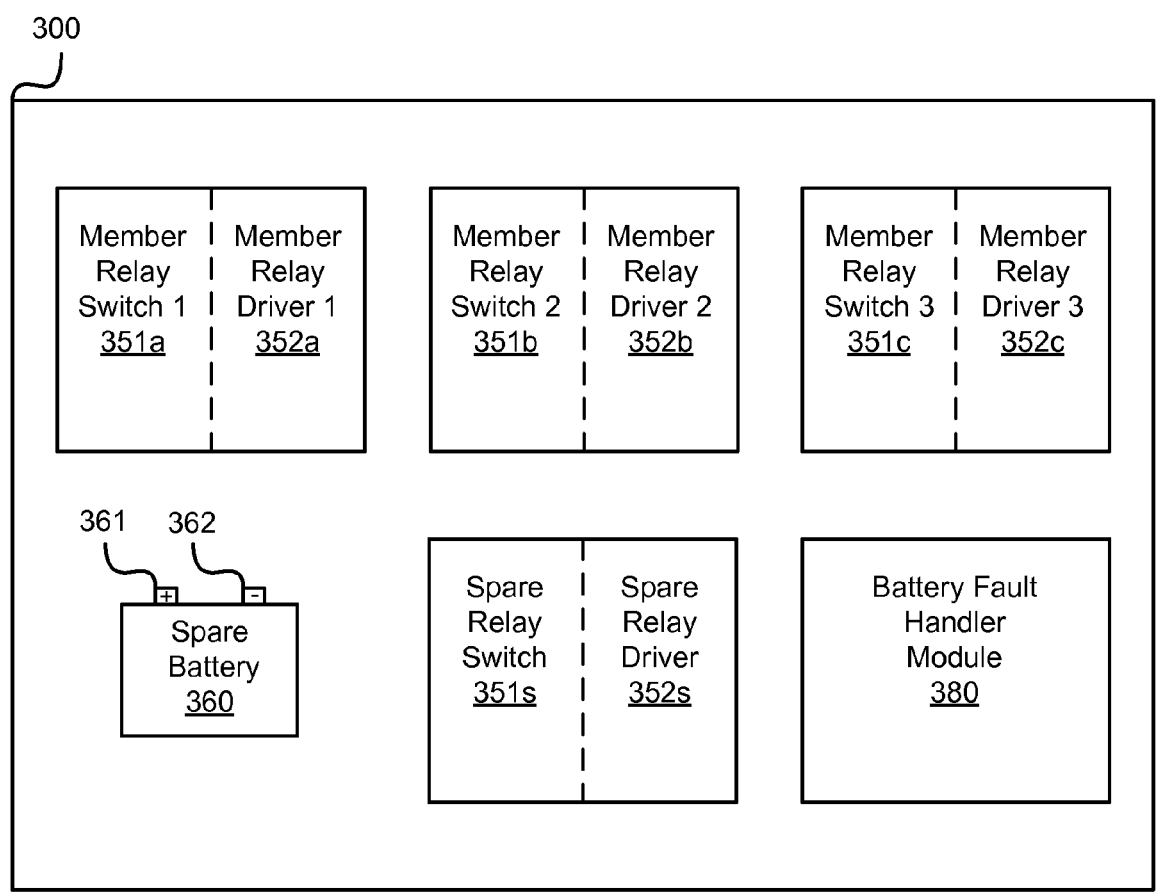
FIG. 3 is a schematic block diagram illustrating one embodiment of an apparatus for automatically displacing a faulty in-use member battery in accordance with the present invention.

FIG. 3 is a schematic block diagram illustrating one embodiment of an apparatus 300 for automatically displacing a faulty in-use member battery in accordance with the present invention. The description of the automatic displacement apparatus 300 refers to elements of FIGS. 1-2, like numbers referring to like elements. Locatable in the battery connect controller 210 of FIG. 2, the automatic displacement apparatus 300 provides main components configured to automatically displace a faulty member battery 160 used in a battery-powered electric equipment, such as EV, while the EV is moving. The automatic displacement apparatus 300 includes a charged spare battery 360, a spare relay switch 351s, a spare relay driver 352s coupled to the spare relay switch 351s, three member relay switches 1, 2, and 3 351a, 351b, and 351c corresponding in number to member batteries 1, 2, and 3

160a, 160b, and 160c, three member relay drivers 1, 2, and 3 352a, 352b, and 352c coupled to corresponding member relay switches 1, 2, and 3 351a, 351b, and 351c, and a battery fault handler module 380.

Said spare battery 360 is configured to have electric characteristics like those of member batteries 160. Commercially already available, such spare battery can be used within one year or longer at a normal temperature once fully charged. Provided in an EV, for example, as a displacement for a faulty in-use member battery, said spare battery 360 is required to be ready instantly on demand while the EV is in motion.

Said spare battery 360 is coupled to the spare relay switch 351s, which is coupled to the battery array 110. Although normally bypassable and disconnectable from the battery array 110 electrically by means of the deactivated spare relay switch 351s, said spare battery 360 is dynamically connectable to the battery array 110 in series electrically when required through the spare relay switch 351s that is activated with a trigger input signal being provided to the spare relay driver 352s. Each member battery 160 is coupled to the corresponding member relay switch 351, which is coupled to the battery array 110. Although normally interconnectable in series with each other electrically by means of deactivated member relay switches 351 to output a predetermined voltage for the battery array 110, each member battery 160 is dynamically bypassable and disconnectable from the battery array 110 electrically when necessary by activating the corresponding member relay switch 351 when a trigger input signal to the coupled member relay driver 352 is provided.

Common basic functions and structures of these relay switches 351 and relay drivers 352 will be described in more details when ensuing drawings are presented. The battery fault handler module 380 includes fault control logic to provide a trigger input signal to each of member relay drivers 352, and the spare relay driver 352s. The logic circuits are configured to output a trigger input signal for each respective member relay driver 352 in response to a fault-detected control signal transmitted by the corresponding member battery 160 that detects a fault condition. Responsive to a fault-detected control signal from any member battery 160 detecting a battery fault condition, a trigger input signal is also provided to the spare relay driver 352s. With the trigger input signal being active, the associated relay switch 351 is activated. Details of said logic circuitry and relay driver circuitry and their operations are given in ensuing descriptions of FIGS. 6-9. Thus, a faulty member battery 160 may be displaced by said spare battery 360.

Figure 4A:
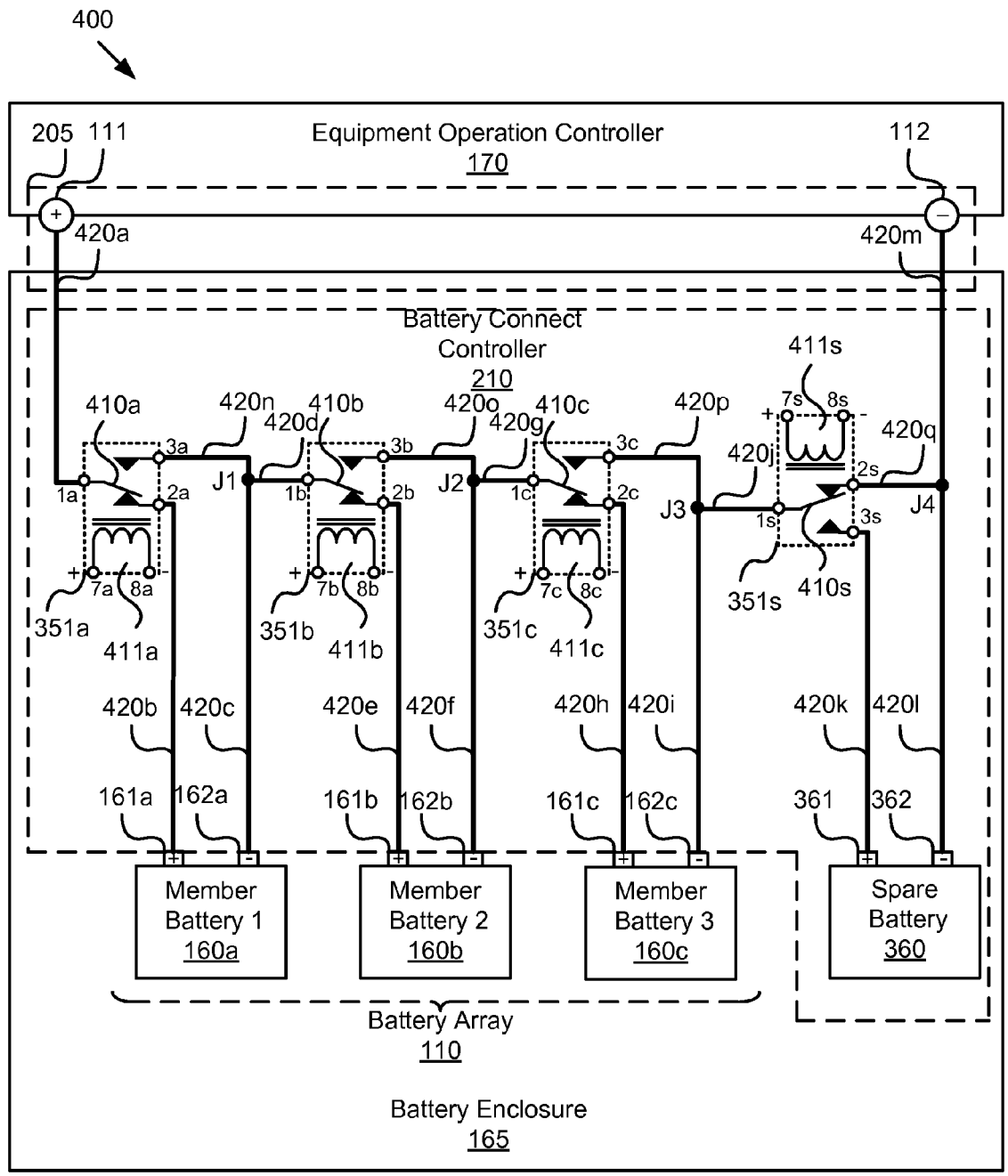
FIGS. 4a and 4b are schematic block diagrams illustrating two alternative embodiments of an arrangement for electrically interconnecting an array of member batteries in series by relay switches with a spare battery standing by in accordance with the present invention.
Figure 4B:
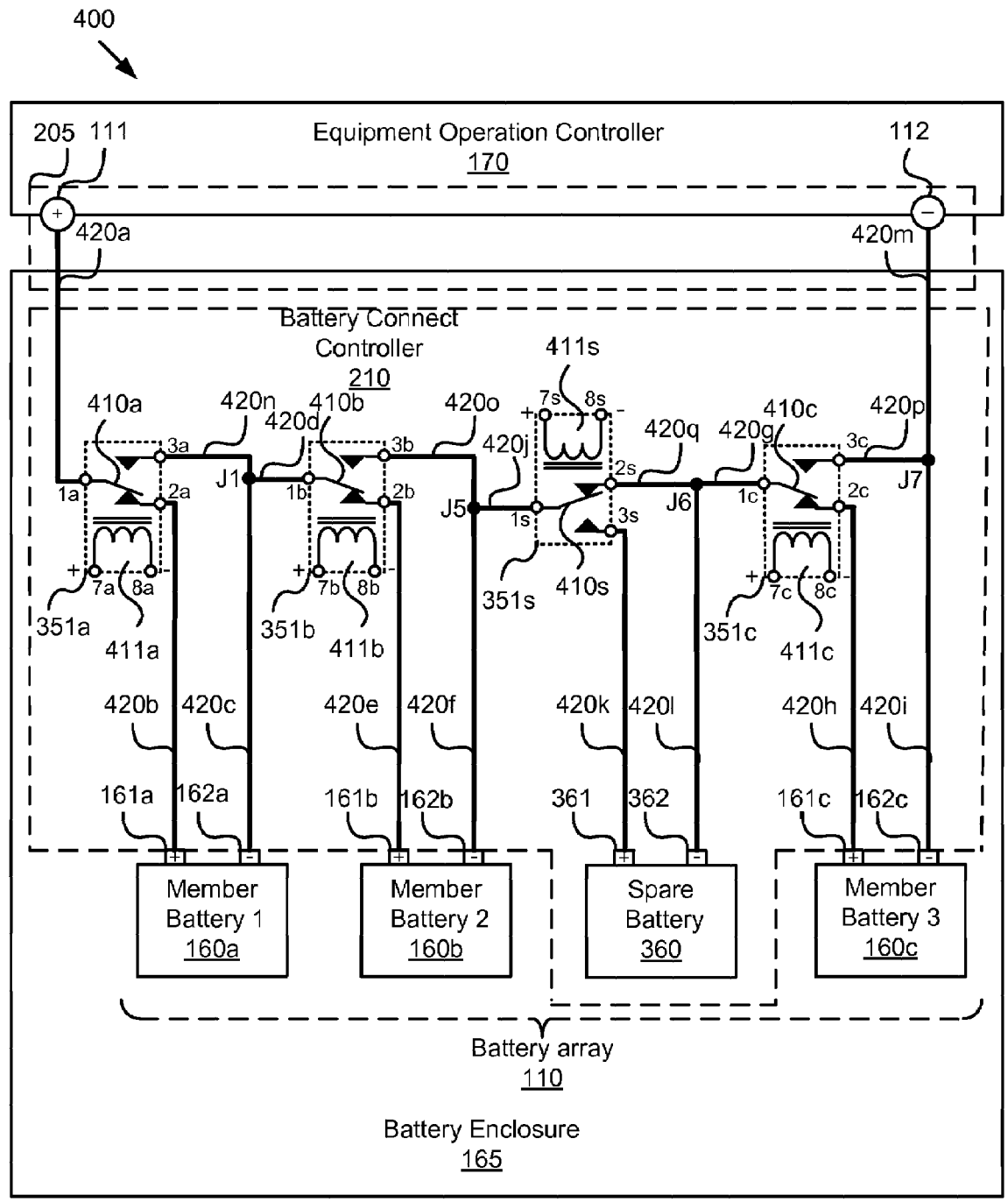

FIGS. 4a and 4b are schematic block diagrams illustrating two alternative embodiments of an arrangement 400 for electrically interconnecting an array of member batteries in series by relay switches with a spare battery standing by in accordance with the present invention. The description of the arrangement 400 refers to elements of FIGS. 1-3, like numbers referring to like elements. As depicted in FIGS. 4a and 4b, the battery connect controller 210 includes three member relay switches 1, 2, and 3 351a, 351b, and 351c, and a spare relay switch 351s. Each shown relay switch 351, of an electromechanical type, includes a common terminal 1 connected to a switch arm 410, a normally closed terminal 2, a normally open terminal 3, a DC relay coil 411, and a pair of voltage input terminals 7 and 8 wherefrom the relay coil 411 may be activated. Although the relay coil 411 shown is to be activated with DC, other types of relay coil that may be designed to be activated with AC are available for use. As known in the art, besides electromechanical relays, in some cases, solid state relays that work without moving parts, for example, may be used. Every relay switch 351 shown is at rest, with the relay coil 411 deactivated, and as such, the common terminal 1 and the normally closed terminal 2 have continuity. Although said relay switch 351 is depicted as a single pole double throw switch, it has additional contacts (not shown) that will be exploited in the description of FIGS. 6-8.

In FIGS. 4a and 4b, the battery connect interface 205 coupling the battery enclosure 165 to the equipment operation controller 170 includes a positive terminal 111, a negative terminal 112, an electric lead 420a, and an electric lead 420m. In FIG. 4a, the spare battery 360 is shown to be coupled to the tail end of the battery array 110. As illustrated in FIG. 4a, to deliver the predetermined voltage across the positive terminal 111 and the negative terminal 112 of the equipment operation controller 170, the arrangement 400 for electrically interconnecting member batteries 160 in series, with all shown relay switches 351 being deactivated, may be traced from left to right as follows:

I. Electric lead 420a connecting the positive terminal 111 of the equipment operation controller 170 to terminals 1a (and 2a) of member relay switch 1 351a, which is connected to the positive terminal 161a of member battery 1 160a with electric lead 420b; II. Electric lead 420c connecting the negative terminal 162a of member battery 1 160a to junction J1, with an extension electric lead 420d to terminals 1b (and 2b) of member relay switch 2 351b, which is connected to the positive terminal 161b of member battery 2 160b with electric lead 420e; III. Electric lead 420f connecting the negative terminal 162b of member battery 2 160b to junction J2, with extension electric lead 420g to terminals 1c (and 2c) of member relay switch 3 351c, which is connected to the positive terminal 161c of member battery 3 160c with electric lead 420h; IV. Electric lead 420i connecting the negative terminal 162c of member battery 3 160c to junction J3, with extension electric lead 420j to terminals 1s (and 2s) of the spare relay switch 351s, which is connected to the negative terminal 362 of the spare battery 360 with electric leads 420q and 420l through junction J4; and V. Electric lead 420m connecting junction J4 to the negative terminal 112 of the equipment operation controller 170.

Likewise, the arrangement 400 shown in FIG. 4b may be similarly described. FIG. 4b differs from FIG. 4a in that the spare battery 360 of FIG. 4b is inserted in the middle, rather than after the tail end, of the battery array 110. The spare battery 360 may also be placed before the head of the battery array 110 (not shown). In both FIGS. 4a and 4b, the spare battery 360 is shown bypassed and disconnected from the battery array 110 at the positive terminal 361. It is worth noting that battery interconnection arrangements such as shown in FIGS. 4a and 4b also apply when the polarities of battery terminals are transposed, so that all the negative terminals including terminal 112 are on the left side and all the positive terminals including terminal 111, on the right side.

Figure 5:
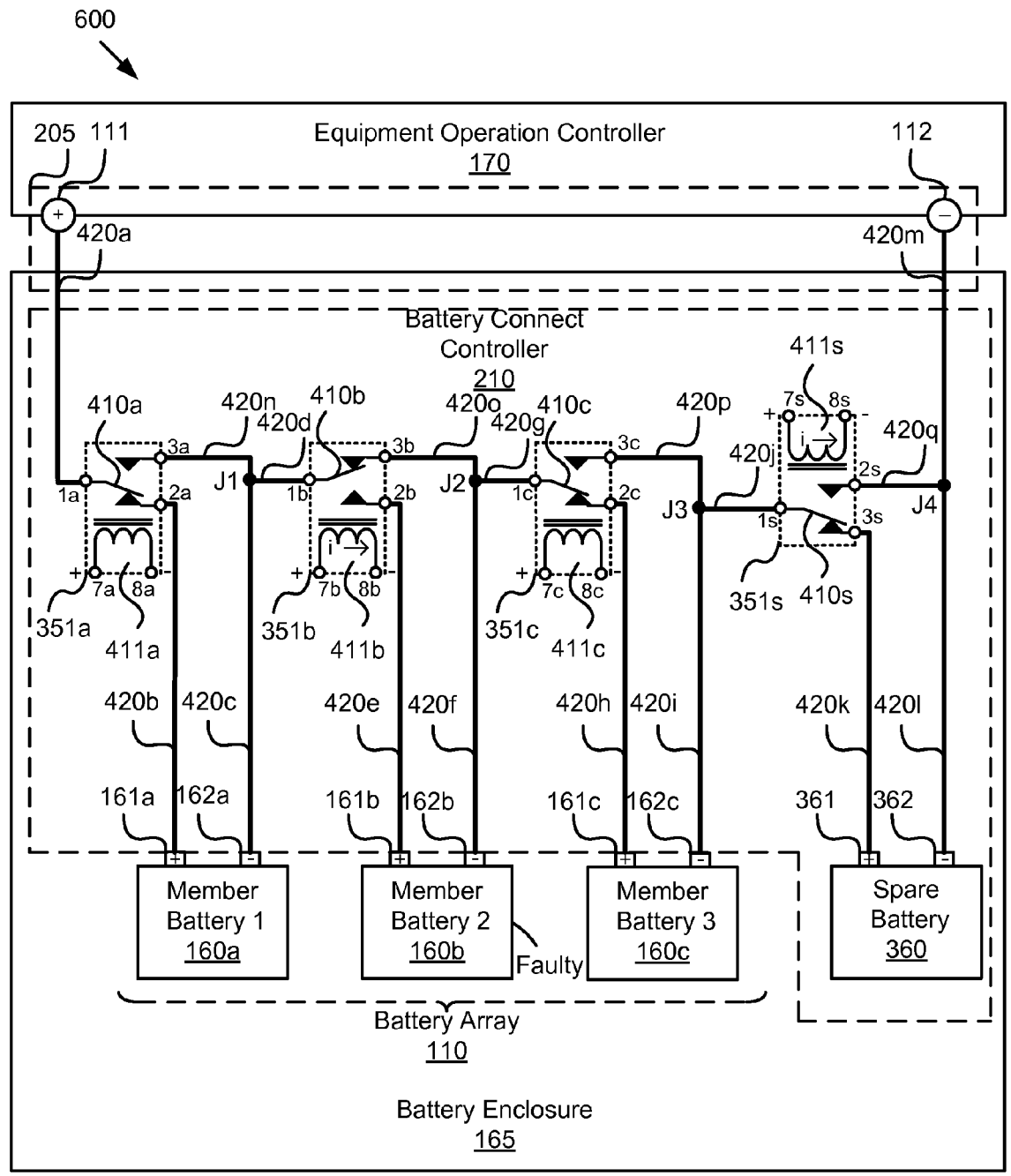
FIG. 5 is a schematic block diagram illustrating one embodiment of a displacement of an exemplary faulty member battery by the spare battery in the arrangement shown in FIG. 4a in accordance with the present invention.

As shown in FIG. 4a, each member battery 160 has an electric bypass path built in between the negative terminal 162 and terminal 3 of the corresponding member relay switch 351 with electric leads 420 through a junction. For example, member battery 2 160b has its negative terminal 162b connected to terminal 3b of member relay switch 2 351b with electric lead 420f and extension electric lead 420o through junction J2. Similarly, an electric bypass path for each member battery 160 is shown in FIG. 4b. The purpose of such battery bypass path will be made clear when FIG. 5 is presented.

Although FIGS. 4a and 4b show that member batteries 160 and the spare battery 360 are connected to terminals of corresponding relay switches 351 directly, in practice, as those skilled in the art would do, some type of electrical connection means are employed between batteries and relay switches in addition to electric leads 420. For instance, a multi-position electric terminal block (also called terminal strip) may be used. In one embodiment, two terminals each with appropriate connection means are made available at each position of said terminal block. One said terminal is used for connection to a battery electric lead 420, and the other said terminal is used for connection to a relay switch lead (not shown). The two terminals at each position may be electrically connected, for example, with a metallic plate of appropriate electric conductivity placed in between. FIGS. 4a and 4b illustrate two alternative embodiments of an arrangement 400 for electrically interconnecting member batteries 160 in series normally, with a coupled spare battery standing by as a displacement on demand, while all corresponding relay switches 351 are deactivated.

Figure 4C:
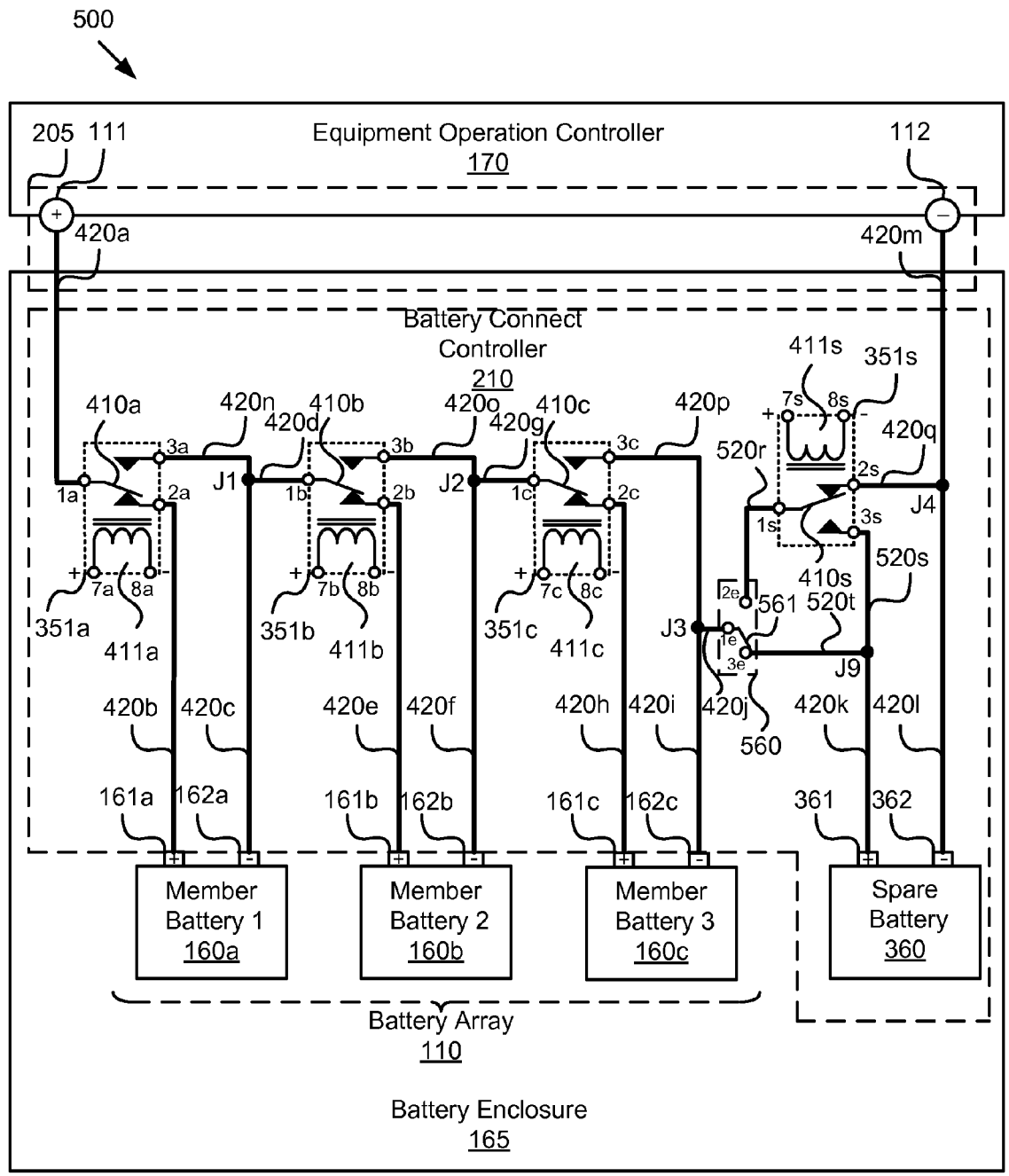
FIG. 4c is a schematic block diagram illustrating one embodiment of an enablement of optional recharging of the spare battery in the arrangement shown in FIG. 4a in accordance with the present invention.

FIG. 4c is a schematic block diagram illustrating one embodiment of an enablement 500 of optional recharging of the spare battery 360 in the arrangement shown in FIG. 4a in accordance with the present invention. The description of FIG. 4c refers to elements of FIGS. 1-4a, like numbers referring to like elements. Although the spare battery 360 such as shown in FIG. 4a is preferably charged and capable of holding its charge for a long period of time once fully charged, so that when on demand it can displace a faulty member battery 160, there may come a time the equipment operator decides to recharge the spare battery 360 as well as member batteries 160 at a battery charge station. The spare battery 360 optional recharging enablement 500 in the disclosed embodiment provides means for allowing the spare battery 360 placed in the arrangement shown in FIG. 4a to be connected electrically in series with the battery array 110 for such recharging. Note that without the inclusion of such enabling means FIG. 4c would be identical to FIG. 4a.

As shown in FIG. 4c, the enabling means provided includes a manually operable single pole double throw toggle switch 560 having a common terminal 1e, a switch arm 561, a first conducting terminal 2e used to enable bypass of the spare battery 360, and a second conducting terminal 3e used to disable bypass of the spare battery 360. Electric lead 420j used to connect junction J3 to the common terminal 1s of the spare relay switch 351s of FIG. 4a now connects junction J3 to the toggle switch common terminal 1e shown in FIG. 4c instead. Also depicted in FIG. 4c are a connection with electric lead 520r between the common terminal 1s of the spare relay switch 351s and the toggle switch 560 conducting terminal 2e, a connection through junction 9 between the positive terminal 361 of the spare battery 360 attaching to electric lead 420k and the toggle switch 560 conducting terminal 3e attaching to electric lead 520t, and a connection with electric lead 520s between junction 9 and the normally open terminal 3s of the spare relay switch 351s.

For normal operations, the toggle switch 560 is always placed in the spare battery 360 bypass enabled position with the switch arm 561 contacting the conducting terminal 2e (not shown), wherein the common terminal 1e and the conducting terminal 2e have continuity. As illustrated in FIG. 4c, with the switch arm 561 of the toggle switch 560 contacting the conducting terminal 3e used to disable the spare battery 360 bypass, the common terminal 1e and the conducting 3e have continuity. Thus, the spare battery 360 is electrically connected in series with the battery array 110, enabling the spare battery 360 to be recharged along with the battery array 110. Presumably, the equipment operator manually places the toggle switch 560 in this position only when he/she decides to recharge the spare battery 360 along with member batteries 160. After the completion of the spare battery 360 recharging, the toggle switch 560 is manually returned to the spare battery bypass enabled position described earlier and remains there all the time until the next time to recharge the spare battery 360. In certain embodiments, multiple spare batteries 360 with switching accessories that have been described are provided to displace multiple member batteries 160 that may become faulty one after another.

FIG. 5 is a schematic block diagram illustrating one embodiment of a displacement 600 of an exemplary faulty member battery 160 by the spare battery 360 in the arrangement shown in FIG. 4a in accordance with the present invention. The description of FIG. 5 refers to elements of FIGS. 1-4a, like numbers referring to like elements. The faulty member battery 160 displacement 600 in the disclosed embodiments results from an occurrence of a battery fault condition detected by a member battery 160, for example, member battery 2 160b as indicated, while the using electric equipment is in operation. In response to a fault-detected control signal from member battery 2 160b as it detects a fault condition, the battery connect controller 210 provides a trigger input signal to member relay switch driver 2 352b (not shown), causing member relay switch 2 351b to be activated while the current (shown with the character i) is flowing through the relay coil 411b. When member relay switch 2 351b is activated, the switch arm 410b thereof moves from the normally closed terminal 2b to the normally open terminal 3b, where terminal 1b and terminal 3b now have continuity, causing member battery 2 160b to be bypassed and disconnected from the battery array 110 at its positive terminal 161b. Note that the interconnection arrangement between batteries and relay switches using electric leads 420 is exactly the same as that of FIG. 4a.

Moreover, as the battery connect controller 210 is further configured to provide a trigger input signal to the spare relay driver 352s (not shown) responsive to the fault-detected control signal from any member battery 160 detecting a fault condition, the spare relay switch 351s is also activated. Note that the current (shown with the character i) is flowing through the relay coil 411s. Thus, the switch arm 410s of the spare relay switch 351s moves from the normally closed terminal 2s to the normally open terminal 3s, where terminal 1s and terminal 3s now have continuity, thereby causing the spare battery 360 to be electrically connected in series with the battery array 110. Thus, the spare battery 360 in effect displaces faulty member battery 2 160b. Note that external connections between the spare battery 360 and the spare relay switch are the same as that of FIG. 4a. The end result of the displacement 600 is that member battery 1 160a, member battery 3 160c, and the spare battery 360 are electrically connected in series, with member battery 2 160b bypassed. In a preferred embodiment, with a local "member battery off" indicator (not shown) identifying the faulty member battery 160, and a local identifying "spare battery on" indicator (not shown) as well as a remote alerting "spare battery on" indicator (not shown) provided to the electric equipment operator, the operator can decide when to stop the operation of the electric equipment for a service action on the faulty member battery 160. The displacement 600 takes place automatically while the using electric equipment such as EV, for example, is in operation; consequently, the battery array 110 continues to deliver the predetermined voltage to the equipment operation controller 170.

Figure 6:
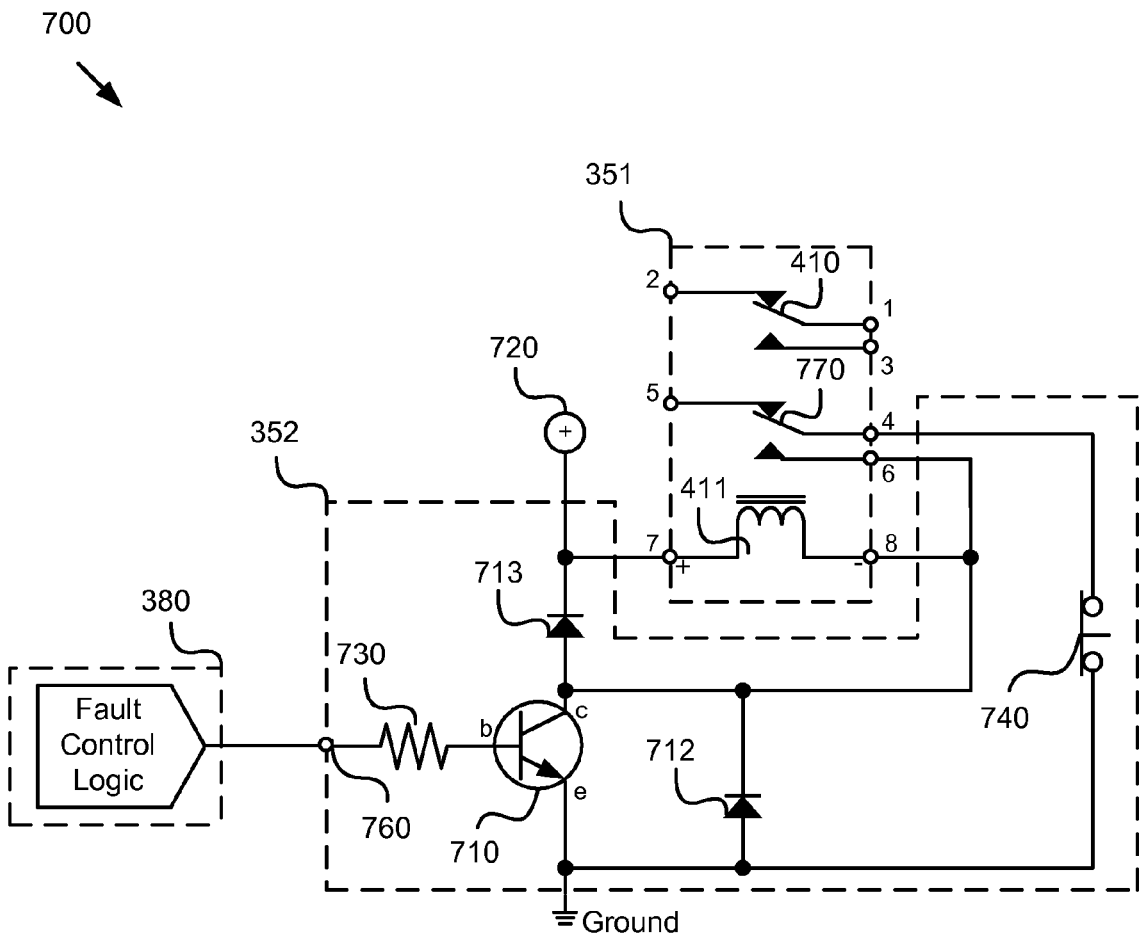
FIG. 6 is a schematic circuit diagram illustrating one embodiment of a relay driver with its input/output interface for relay switch activation in accordance with the present invention.

FIG. 6 is a schematic circuit diagram illustrating one embodiment of a relay driver with its input/output interface 700 for relay switch activation in accordance with the present invention. The description of FIG. 6 includes elements of FIGS. 3-4, like numbers referring to like elements. As commonly used in the art, the circuit components of the relay driver 352 include a resistor 730, an n-p-n transistor 710, diodes 712, and 713, and a normally closed switch 740. The input/output interface of the relay driver 352 includes an input signal terminal 760, a terminal for connection to positive voltage source 720 and the relay switch 351 terminals to be described below. The positive voltage source 720 may be a +12 volt supply, for example, if the coil 411 of the relay switch 351 has a 12-volt DC voltage rating.

On the input side of the relay driver 352, the input signal terminal 760 is connected to the output of fault control logic incorporated in the battery fault handler module 380. The resistor 730 is interposed between the input terminal 760 and the base of the transistor 710 and is used to limit the amount of the base current. On the output side of the relay driver 352, terminal 7 of the relay coil 411 of the relay switch 351 is connected to the cathode of the diode 713 and to the positive voltage source 720. Terminal 8 of the relay coil 411 of the relay switch 351 is connected to the cathode of the diode 712, to the collector of the transistor 710, to the anode of the diode 713, and to the normally open terminal 6 of the second set of contacts of the relay switch 351. The common terminal 4 of the second set of contacts of the relay switch 351 that is internally connected to the switch arm 770 thereof is connected to the top end of the normally closed switch 740. The anode of the diode 712 is connected to the emitter of the transistor 710, to the bottom end of the normally closed switch 740, and to ground. As depicted, with the relay coil 411 being deactivated, the common terminal 4 and the normally closed terminal 5 have continuity. Incidentally, internal connections among the first set of contacts at terminals 1, 2, and 3 of the deactivated relay switch 351 is the same as those illustrated in FIGS. 4a and 4b. That is, terminals 1 and 2 have continuity with terminal 3 floating.

The signal from the output of fault control logic of the battery fault handler module 380, referred to previously as trigger input signal, applied to the input signal terminal 760 provides a switching signal to the base of the transistor 710 through the resistor 730. The switching signal alternately enables or disables the base-emitter junction of said transistor 710, depending on whether the trigger input signal at the input terminal 760 is in a high level (approximately +5 volts with Transistor-transistor Logic, for example) or in a low level (0 volt). When the base-emitter junction of the transistor 710 is enabled, the collector-emitter junction of the transistor 710 is switched to an easy conduction state, and current flows from the positive voltage source 720 through the winding of the relay coil 411 and the collector-emitter path of the transistor 710 to ground. When the relay coil 411 is thus activated, the switch arms 770 and 410 will move to the normally open terminals 6 and 3 of the relay switch 351, respectively, which are shown in FIGS. 7 and 8.

Subsequently, when the base-emitter junction is disabled, such as when the trigger input signal at the input terminal 760 switches from the high level to the low level, the transistor 710 turns off, presenting a high impedance across its collector-emitter path. However, because switch arm 770 already moved to the normally open terminal 6 prior to said switching to the low level of the trigger input signal, terminal 8 of relay coil 411 was connected to ground through terminals 6 and 4 and the normally closed switch 740 (as shown in FIGS. 7 and 8). Current continues to flow from the positive voltage source 720 through the winding of the relay coil 411 to ground, keeping the relay switch 351 activated while said transistor 710 is off. This relay driver 352 is made self-latching, meaning that once the coupled relay switch 351 is activated, it remains in that state until the normally closed switch 740 is manually depressed and momentarily disrupts power to the latching circuit, thereby deactivating the relay switch 351.

As well known in the art, interruption of the current flow through the relay coil 411 induces a voltage across the winding of the relay coil 411 with a polarity positive at terminal 8 and negative at terminal 7. This reverse voltage combines additively with the voltage from the positive voltage source 720 and might be large enough to cause damages to said transistor 710 and the relay coil 411. Diodes 712 and 713 are commonly used as back electromotive force suppressors and can filter off any sparking when the relay switch 351 deactivates. The relay driver 352 circuitry with its input/output interface 700 effectively activates the coupled relay switch 351 and keeps it activated even after its trigger input signal is switched from the high level to the low level.

Figure 7:
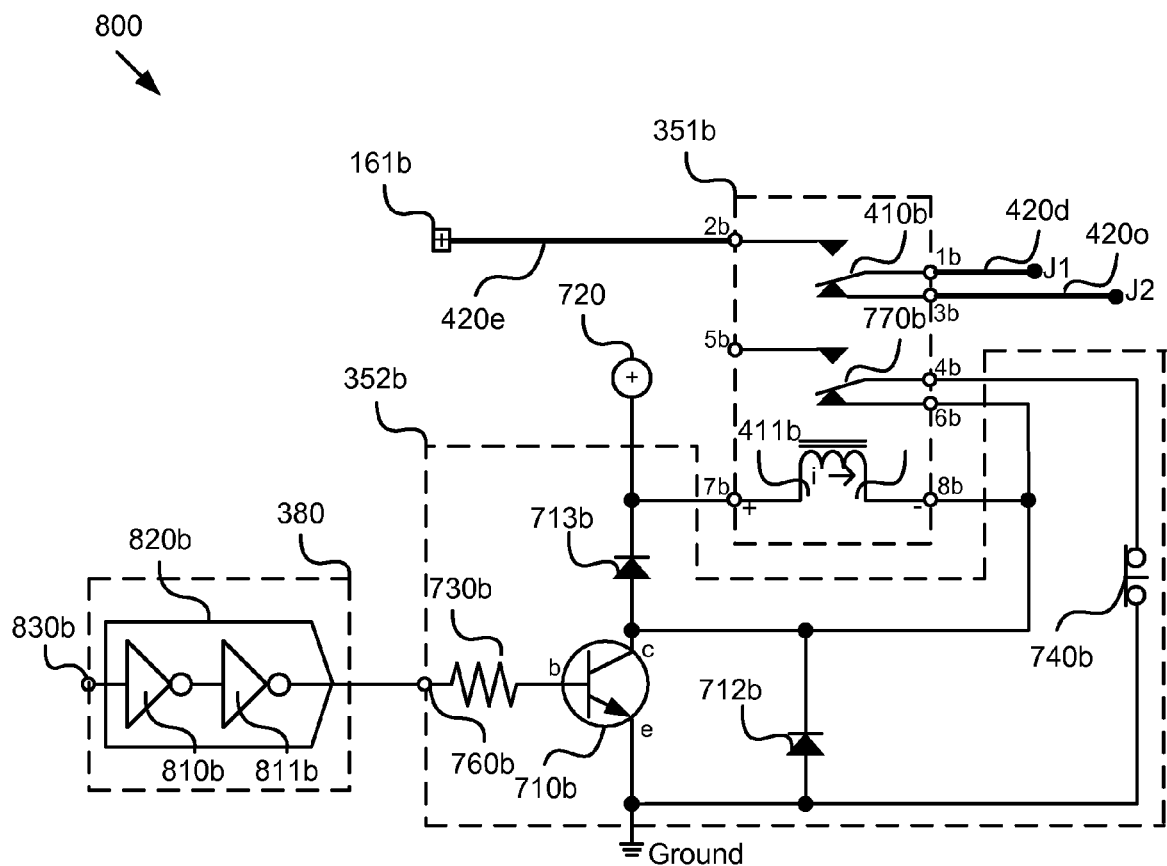
FIG. 7 is a schematic circuit diagram illustrating one embodiment of a member relay switch activation responsive to a control signal from the corresponding faulty member battery of FIG. 5 in accordance with the present invention.
Figure 8:
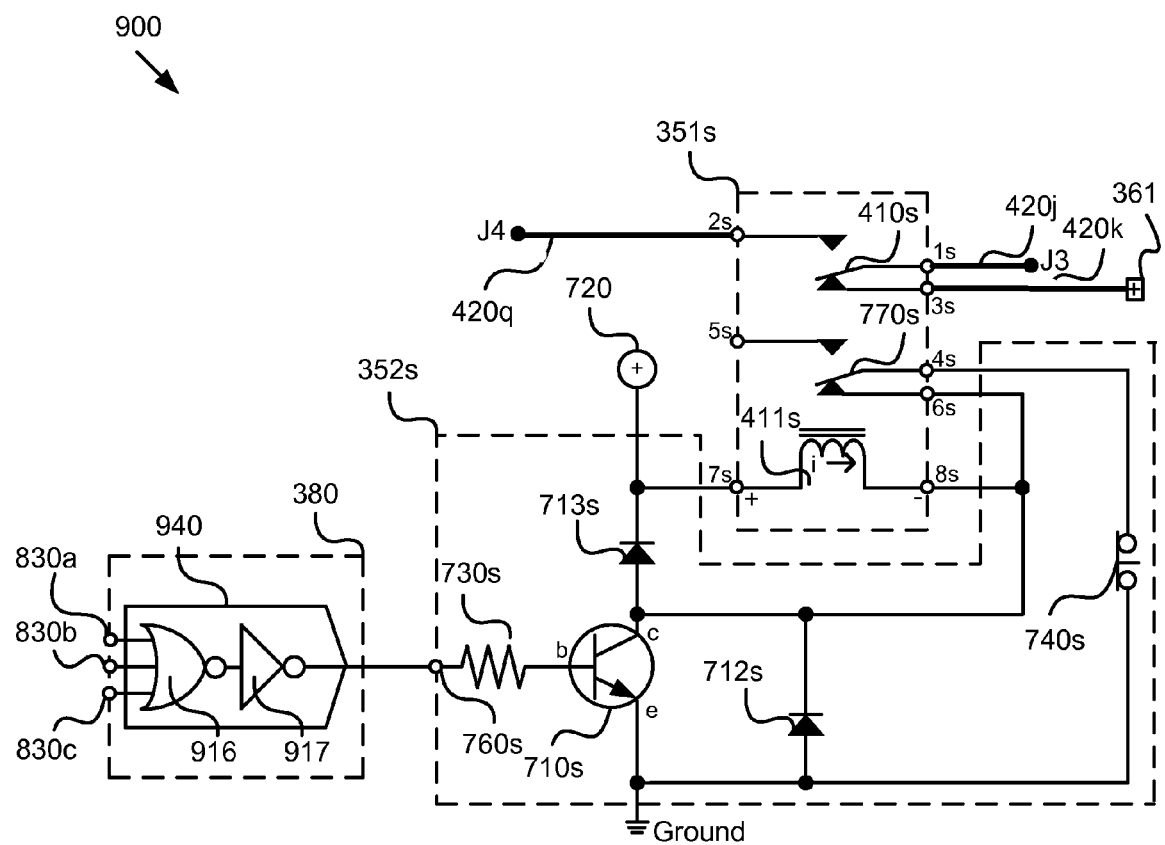
FIG. 8 is a schematic circuit diagram illustrating one embodiment of a spare relay switch activation responsive to a control signal from any faulty member battery in accordance with the present invention.

FIG. 7 is a schematic circuit diagram illustrating one embodiment of a member relay switch activation 800 responsive to a control signal from the corresponding faulty member battery of FIG. 5 in accordance with the present invention. The description of FIG. 7 refers to elements of FIGS. 1-6, like numbers referring to like elements. When the faulty member battery 2 160b as indicated in FIG. 5 sends out a fault-detected control signal to the battery fault handler module 380, the member relay switch 2 351b activation 800 occurs. The battery fault handler module 380 includes logic circuits 820a (not shown), 820b, and 820c (not shown) to respond to control signals present at respective input terminals 830a (not shown), 830b, and 830c (not shown) sent by member batteries 160a, 160b, and 160c (not shown), respectively, upon the detection of a fault condition. The logic circuitry 820 for each member battery 160 includes two NOT gates (also known as inverters) 810 and 811 connected in series. By convention, when said control signal switches from a low level to a high level, the signal is considered "present".

As such, when the faulty member battery 160b raises its fault-detected control signal to a high level, said signal received at the input terminal 830b of the logic circuitry 820b will cause the output signal of the logic circuitry 820b to be in the high level through the two in-series inverters 810b and 811b. As learned from the description of FIG. 6, with this trigger input signal applied to the input terminal 760b of member relay driver 2 352b, the base-emitter junction of the transistor 710b of member relay driver 2 352b is thus enabled, and the collector-emitter junction of the transistor 710b is switched to a conduction state. Current starts to flow from the positive voltage source 720 through the winding of the relay coil 411b (shown with the character i) of member relay switch 2 351b, thereby activating member relay switch 2 351b.

As a result, switch arm 410b and switch arm 770b move to the normally open terminals 3b and 6b, respectively. Terminal 6b and terminal 4b have continuity, causing terminal 8b of the relay coil 411b to be connected to ground, thus maintaining the current flow through the winding of the relay coil 411b even after the trigger input signal at the input terminal 760b is switched to low level. As described in a previous discussion, terminals 1b and 3b of member relay switch 2 351b have continuity. Electric leads 420 shown coupling member relay switch 2 351b to other components are the same as those of FIG. 5. As illustrated in FIG. 5, member battery 2 160b is thus electrically bypassed with the positive terminal 160b thereof being floating instead of being electrically connected to the battery array 110. Although member battery 2 160b has been selected as an exemplary faulty battery, similar bypassing and disconnecting actions can be applied to member battery 1 160a and member battery 3 160c when becoming faulty.

FIG. 8 is a schematic circuit diagram illustrating one embodiment of a spare relay switch activation 900 responsive to a control signal from any faulty member battery of FIG. 5 in accordance with the present invention. The description of FIG. 8 refers to elements of FIGS. 1-7, like numbers referring to like elements. The spare relay switch 351*s* activation 900 occurs when any faulty member battery 160 (not shown) sends out a fault-detected control signal to the battery fault handler module 380. The battery fault handler module 380 as shown also includes logic circuitry 940 to respond to said control signal present at any one of its three input terminals 830*a*, 830*b*, and 830*c* when it is sent by member battery 1, 2, or 3 160*a*, 160*b*, or 160*c* (not shown) detecting a fault condition, respectively. The logic circuitry 940 includes one 3-input NOR gate 916 and one NOT gate 917 connected in series. Note that these two logic gates combined to form a non-inverting OR gate. As mentioned previously, when said signal goes to a high level from a low level, the signal is considered "present". For the exemplary faulty member battery 2 160*b*, the control signal raised by faulty member battery 2 160*b* is received at the input terminal 830*b* of the NOR gate 916. The output signal of the NOR gate 916 is inverted to the low level. However, after this output signal passes through the NOT gate 917, the output of the NOT gate 917 will be in the high level again.

As such, when fault member battery 2 160*b* raises its fault-detected control signal, said signal received at the input terminal 830*b* of the logic circuitry 940 will cause the output signal of the logic circuitry 940 to be in the high level. Based on the description of FIG. 6, with this signal used as a trigger input signal to the input terminal 760*s* of the spare relay driver 352*s*, the base-emitter junction of the transistor 710*s* of the spare relay driver 352*s* is thus enabled, and the collector-emitter junction of the transistor 710*s* is switched to a conduction state. Current starts to flow from the positive voltage source 720 through the winding of the relay coil 411*s* (shown with a character i) of the spare relay switch 351*s*, thereby activating the spare relay switch 351*s*.

As a result, switch arm 410*s* and switch arm 770*s* move to the normally open terminals 3*s* and 6*s*, respectively. Terminal 6*s* and terminal 4*s* have continuity, causing terminal 8*s* of the spare relay coil 411*s* to be connected to ground, thus maintaining current flow through the winding of the spare relay coil 411*s* even after the trigger input signal at the input terminal 760*s* is switched to low level. Terminals 1*s* and 3*s* now have continuity. Electric leads 420 shown coupling the spare relay switch 351*s* to other components are the same ones that are depicted in FIG. 5. As shown in FIG. 5, the spare battery 360 is thus electrically connected from its positive terminal 361 to the negative terminal 162*c* of member battery 3 160*c* through terminals 3*s* and 1*s* of the spare relay switch 351*s* and J3, with the negative terminal 362 remaining connected to the positive terminal 112 of the equipment operation controller 170. The spare battery 360 is now electrically connected in series with the battery array 110. In conjunction with the description of FIG. 7, with the activation 900 of the spare relay switch 351*s* responsive to the control signal from the faulty member battery 2 160*b*, the spare battery 360 has been shown displacing faulty member battery 2 160*b*, confirming the displacement demonstration illustrated in FIG. 5.

Figure 9:
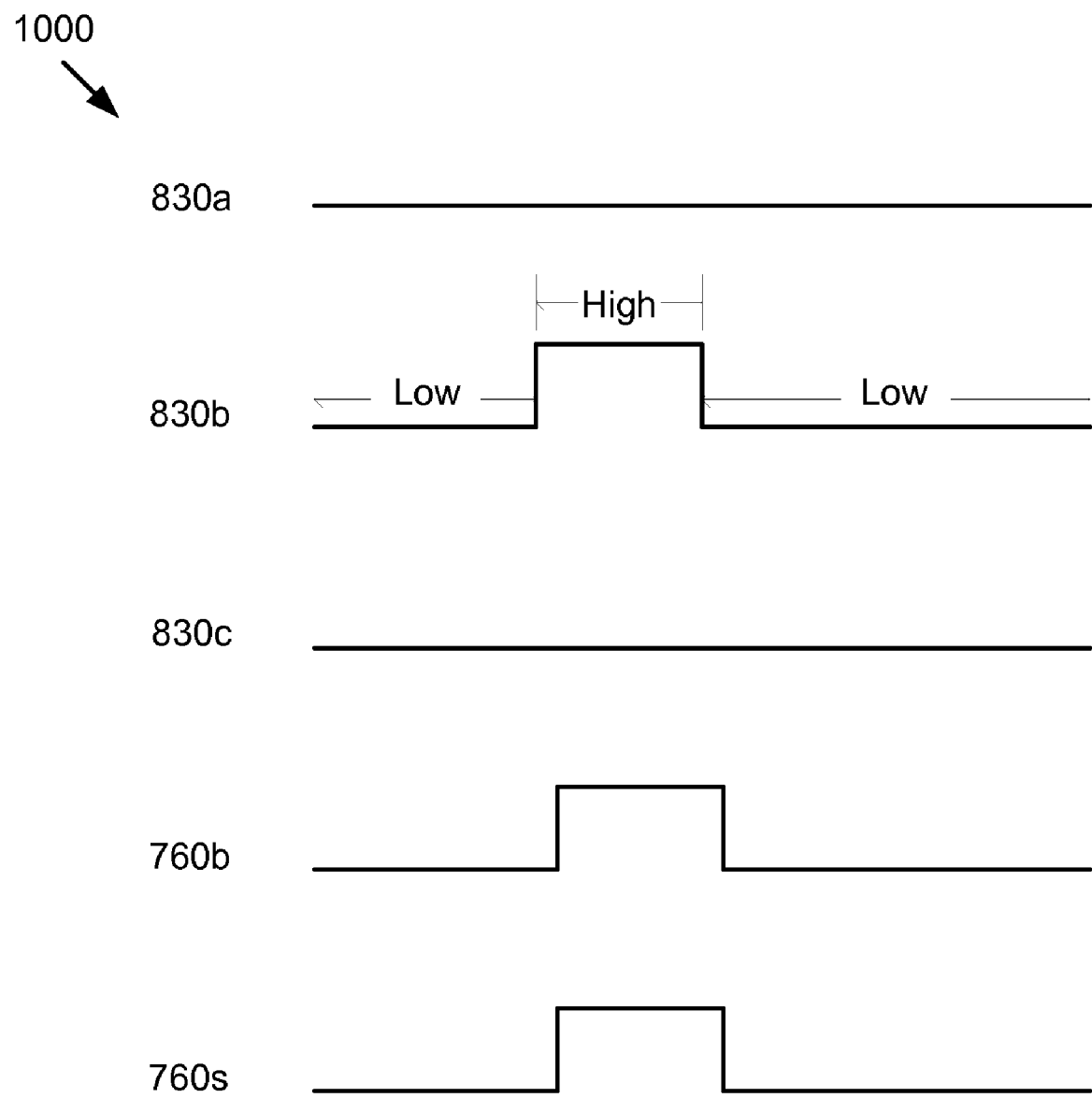
FIG. 9 is a time chart illustrating one embodiment of the operations of fault control logic shown in FIGS. 7 and 8 resulting in providing trigger input signals to relay drivers in accordance with the present invention.

FIG. 9 is a time chart illustrating one embodiment of the operations 1000 of fault control logic shown in FIGS. 7 and 8 resulting in providing trigger input signals to relay drivers in accordance with the present invention. The description of FIG. 9 refers to elements of FIGS. 7 and 8, like numbers referring to like elements. The operations 1000 of said fault control logic result in the presence of trigger input signals at input terminals 760*b* and 760*s* of member relay driver 2 352*b* and the spare relay driver 352*s*, respectively, according to descriptions of FIGS. 7 and 8.

According to the description of FIG. 7, when the input signal present at input terminal 830*b* of fault control logic 820*b* changes from low level to high level, as illustrated in the time chart, the output signal of fault control logic 820*b* rises to the high level. Thus, the trigger input signal at input terminal 760*b* is in the high level, as shown in the time chart. Therefore, the base-emitter junction of the transistor 710*b* of member relay driver 2 352*b* is enabled, leading to an activation of member relay switch 2 351*b*.

With an input signal at any input terminal 830 of fault control logic 940 of FIG. 8 being in the high level, the output signal of said fault control logic 940 rises to the high level. The case in point has the input signal at input terminal 830*b* in the high level, as raised by faulty member battery 2 160*b* (not shown), while input signals at input terminals 830*a* and 830*c* are in the low level. Thus, the trigger input signal at input terminal 760*s* of the spare relay driver 352*s* is in the high level, as shown in the time chart. Therefore, as mentioned in a previous discussion, the base-emitter junction of the transistor 710*s* of the spare relay driver 352*s* is enabled, leading to an activation of the spare relay switch 351*s*. The operations 1000 of fault control logic shown in FIGS. 7 and 8 thus lead to activation of faulty member relay switch 2 351*b* and the spare relay switch 351*s*, respectively.

The following schematic flow chart diagram is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 10:
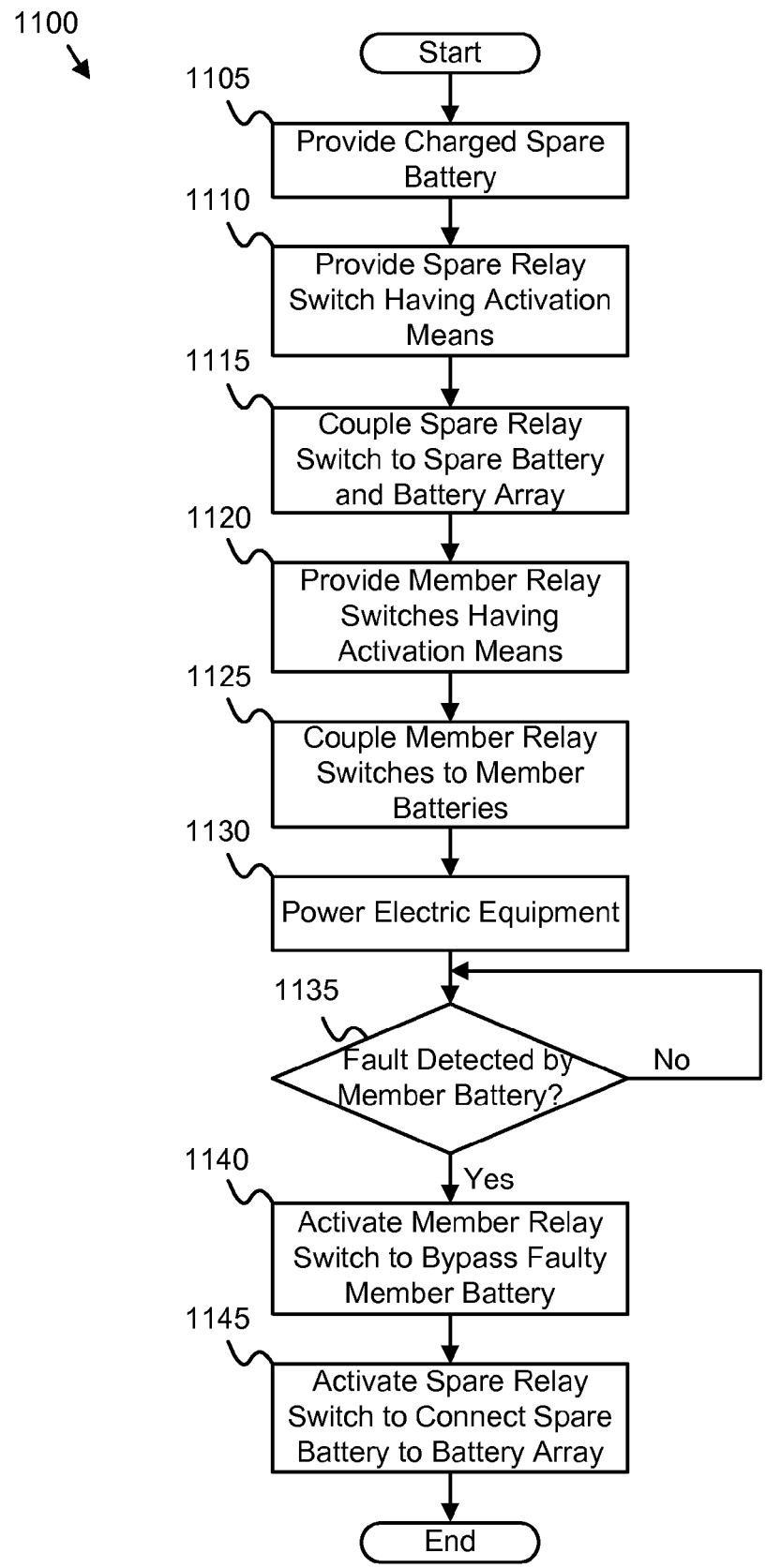
FIG. 10 is a schematic flow chart diagram illustrating one embodiment of a method for automatically displacing a faulty in-use member battery in a battery-powered electric equipment in accordance with the present invention.

FIG. 10 is a schematic flow chart diagram illustrating one embodiment of a method 1100 for automatically displacing a faulty in-use member battery in a battery-powered electric equipment in accordance with the present invention. The description of FIG. 10 refers to elements of FIGS. 1-9, like numbers referring to like elements. The method 1100 begins by providing 1105 a charged spare battery 360 configured to have electric characteristics like those of member batteries 160. The method 1100 further provides 1110 a spare relay switch 351*s* that has activation means such as the spare relay driver 352*s*. As described in a previous discussion, in one embodiment, the spare relay driver 352*s* may be triggered to activate the spare relay switch 351*s*. The method 1100 proceeds to couple 1115 the spare relay switch 351*s* to the spare battery 360 and the battery array 110, such as, per FIG. 4*a*, connecting the common terminal 1*s* to junction J3, connecting the normally closed terminal 2*s* to the negative terminal 362 of the spare battery 360 through junction J4 and to the negative terminal 112 of the equipment operation controller 170, and further connecting the normally open terminal 3*s* to the positive terminal 361 of the spare battery 360. Thus, while the spare relay switch 351 is deactivated with terminals 1*s* and 2*s* having continuity, the spare battery 360 is shown as normally bypassed electrically by the battery array 110, with the positive terminal 361 of the spare battery 360 floating. However, when the spare relay switch 351*s* is activated, causing terminals 1*s* and 3*s* to have continuity instead, the spare battery 360 will be connected to the battery array 110 in series electrically, as shown in FIG. 5.

The method 1100 continues to provide 1120 member batteries 1, 2 and 3 160*a*, 160*b*, and 160*c* with member relay switches 1, 2, and 3 351*a*, 351*b*, and 351*c*, corresponding in number to member batteries 160. These member relay switches 351 have means for activation, such as corresponding member relay drivers 1, 2, and 3 352*a*, 352*b*, and 352*c*. In one embodiment, each member relay driver 352 may be triggered to activate the associated member relay switch 351. The method 1100 then couples 1125 said member relay switches 351 to member batteries 160 to interconnect them in series electrically for the battery array 110 to provide a predetermined voltage. As illustrated in FIG. 4*a*, a left-to-right coupling arrangement begins with member relay switch 351*a* by connecting terminal 1*a* to the positive terminal 111 of the equipment operation controller 170, terminal 2*a* to the positive terminal 161*a* of member battery 1 160*a*, and terminal 3*a* to the negative terminal 162*a* of the same member battery 1 160*a* through junction J1. Said arrangement continues with member relay switches 2 and 3 351*b* and 351*c*, respectively, each time by connecting terminal 1 to the preceding junction, terminal 2 to the positive terminal 161 of the corresponding member battery 160, and terminal 3 to the negative terminal 162 of the same member battery 160 through the next junction. Thus, while all the relay switches are deactivated with terminals 1 and 2 having continuity as shown, the entire battery 110 has electrically three member batteries 160 coupled in series and the spare battery 360 bypassed. However, when a member relay switch 351 is activated, causing its terminals 1 and 3 to have continuity instead, its corresponding member battery 160 will be bypassed and disconnected from the battery array 110 electrically, such as the case of the activated member relay switch 2 351*b* shown in FIG. 5.

The method 1100 powers 1130 the electric equipment for operation. With the electric equipment running, the battery fault handler module 380 determines 1135 if a fault-detected control signal is sent by any member battery 160. If a fault-detected signal is sent by a member battery 160, the battery fault handler module 380 activates 1140 the corresponding member relay switch 351 to electrically bypass the faulty member battery 160 and disconnect it from the battery array 110 by providing a trigger input signal to the coupled member relay driver 352. Concurrently, the battery fault handler module 380 activates 1145 the spare relay switch 351*s* to electrically connect the spare battery 360 with the battery array 110 in series. FIG. 5 illustrates the electrical bypassing and disconnection from the battery array 110 of an exemplary faulty member battery 2 160*b* and the electrical connection of the spare battery 360 to the battery array 110 in series following the activation of their associated relay switches. Thus, the method 1100 accomplishes the automatic displacement of a faulty in-use member battery 160 in a battery-powered electrical equipment.

The present invention provides an automatic displacement for a faulty in-use battery in a battery-powered electric equipment, such as EV, simply by properly connecting and applying a plurality of double pole double throw relay switch means to a redundant array of independently operating batteries ("RAIB") including a standby charged spare battery ready for use on demand while the EV is in motion. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for automatically displacing a faulty in-use battery in an electric equipment, such as electric vehicle, powered by an array of member batteries, the apparatus comprising:
    a charged spare battery connectable to said battery array in series electrically, said spare battery configured to have electric characteristics like those of the member batteries;
    a spare relay switch coupled to said spare battery and said battery array, while normally deactivated, the spare relay switch configured to have said spare battery electrically bypassed by said battery array, and upon activation, the activated spare relay switch configured to electrically connect said spare battery in series with said battery array;
    a plurality of member relay switches corresponding in number to the member batteries and coupled to the corresponding member batteries, each member battery configured to detect fault conditions therein and output a control signal upon such detection, the member relay switches while normally deactivated configured to electrically interconnect corresponding member batteries in series to output a predetermined voltage, and upon individual activation, the activated member relay switch configured to have the corresponding member battery electrically bypassed by said battery array; and
    a battery fault handler module responsive to said control signal from a member battery configured to initiate the activation of the spare relay switch and the member relay switch corresponding to the member battery.

2. The apparatus of claim 1, wherein each relay switch has means for activation thereof and means for maintaining the activation.

3. The apparatus of claim 2, wherein the relay switch activation maintaining means further comprises a normally closed switch manually operable to deactivate the relay switch.

4. The apparatus of claim 1, wherein a member battery comprises a plurality of batteries inter-coupled by a certain arrangement in a single package.

5. The apparatus of claim 1, wherein said spare battery is provided with means for manually enabling recharging thereof.

6. The apparatus of claim 1, wherein a plurality of said spare batteries are provided to displace in-use member batteries becoming faulty in succession.

7. A system for automatically displacing a faulty in-use battery in a battery-powered electric equipment, such as electric vehicle, the system comprising:
    an equipment operating unit;
    an equipment operation controller, coupled to the equipment operating unit; and
    a battery enclosure with battery cooling means, coupled to the equipment operation controller, the battery enclosure comprising:
        a plurality of member batteries forming a battery array, each member battery configured to detect fault conditions therein and output a control signal upon such detection; and a battery connect controller, coupled to said battery array, the battery connect controller comprising:
    a charged spare battery connectable to said battery array in series electrically, said spare battery configured to have electric characteristics like those of the member batteries;
    a spare relay switch coupled to said spare battery and said battery array, while normally deactivated, the spare relay switch configured to have said spare battery electrically bypassed by said battery array, and upon activation, the activated spare relay switch configured to electrically connect said spare battery in series with said battery array;
    a plurality of member relay switches corresponding in number to the member batteries and coupled to the corresponding member batteries, the member relay switches while normally deactivated configured to electrically interconnect corresponding member batteries in series to output a predetermined voltage, and upon individual activation, the activated member relay switch configured to have the corresponding member battery electrically bypassed by said battery array;
    a battery fault handler module responsive to said control signal from a member battery configured to initiate the activation of the spare relay switch and the member relay switch corresponding to the member battery; and
    a plurality of electric leads with connection means configured to electrically interconnect said components.

8. The system of claim 7, wherein each relay switch has means for activation thereof and means for maintaining the activation.

9. The system of claim 8, wherein the relay switch activation maintaining means further comprises a normally closed switch manually operable to deactivate the relay switch.

10. The system of claim 7, wherein indicators for identifying a faulty member battery and the spare battery placed in operation are provided.

11. The system of claim 7, wherein said battery array comprises only one member battery.

12. The system of claim 7, wherein the battery connect controller is an optional purchase item for the electric equipment purchaser.

13. A method for automatically displacing a faulty in-use battery in an electric equipment, such as electric vehicle, powered by an array of member batteries, the method comprising:
    providing a charged spare battery connectable to said battery array in series electrically, said spare battery configured to have electric characteristics like those of member batteries;
    providing a spare relay switch coupled to said spare battery and said battery array, while normally deactivated, the spare relay switch configured to have said spare battery electrically bypassed by said battery array, and upon activation, the activated spare relay switch configured to electrically connect said spare battery in series with said battery array;
    providing a plurality of member relay switches corresponding in number to member batteries and coupled to the corresponding member batteries, each member battery configured to detect fault conditions therein and output a control signal upon such detection, the member relay switches while normally deactivated configured to electrically interconnect member batteries in series to output a predetermined voltage, and upon individual activation, the activated member relay switch configured to have the corresponding member battery electrically bypassed by said battery array;
    powering the electric equipment for operation; and
    activating in response to a member battery outputting said control signal the spare relay switch and the member battery relay switch corresponding to the member battery.

14. The method of claim 13, wherein each relay switch has means for activation thereof and means for maintaining the activation.

15. The method of claim 14, wherein the relay switch activation maintaining means further comprises a normally closed switch manually operable to deactivate the relay switch.

16. The method of claim 13, wherein said spare battery can be disposed at any convenient position between the two end terminals of said battery array.

17. An apparatus for automatically displacing a faulty in-use battery in an electric equipment, such as electric vehicle, powered by an array of member batteries, the apparatus comprising:
    means for accommodating at least one charged spare battery connectable to said battery array in series electrically, said spare battery configured to have electric characteristics like those of member batteries;
    means for having said spare battery electrically bypassed by said battery array normally;
    means for electrically interconnecting member batteries in series to output a predetermined voltage normally, each member battery configured to detect faults thereof and output a control signal upon such detection;
    means for having a member battery outputting said control signal electrically bypassed by said battery array;
    means for electrically connecting said spare battery in series with said battery array upon the occurrence of said control signal;
    means for interconnecting said components;
    means for powering the electric equipment for operation;
    means for cooling said batteries;
    means for identifying a faulty member battery;
    means for identifying the spare battery placed in operation;
    means for manually enabling recharging of said spare battery; and
    means for preparing for the initiation of a service action on the faulty member battery.

* * * * *